Jan. 13, 1942.  C. R. ROGERS ET AL  2,269,988
VEHICLE
Filed Feb. 24, 1941
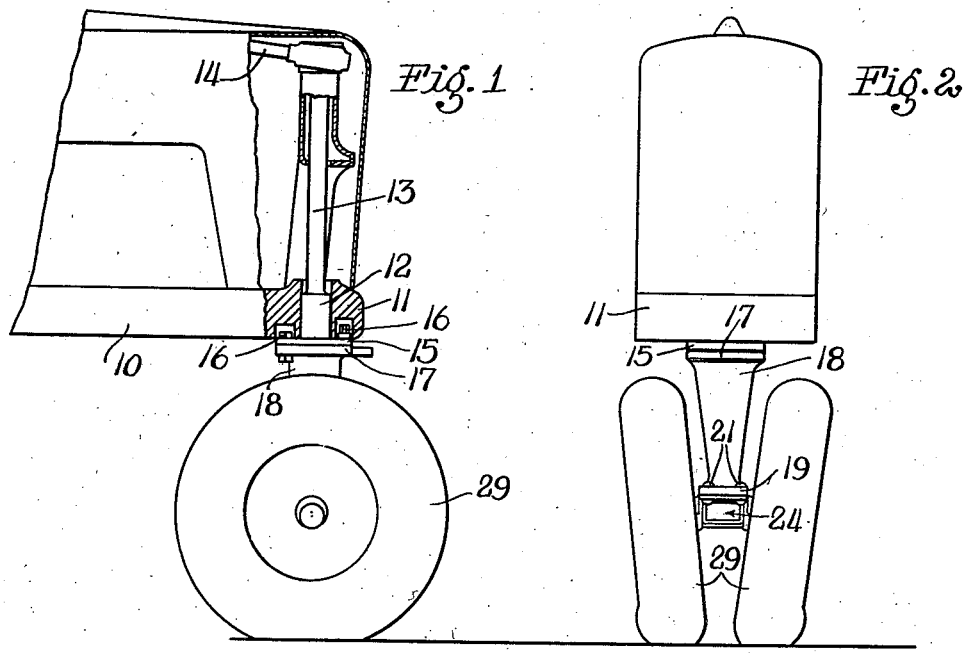
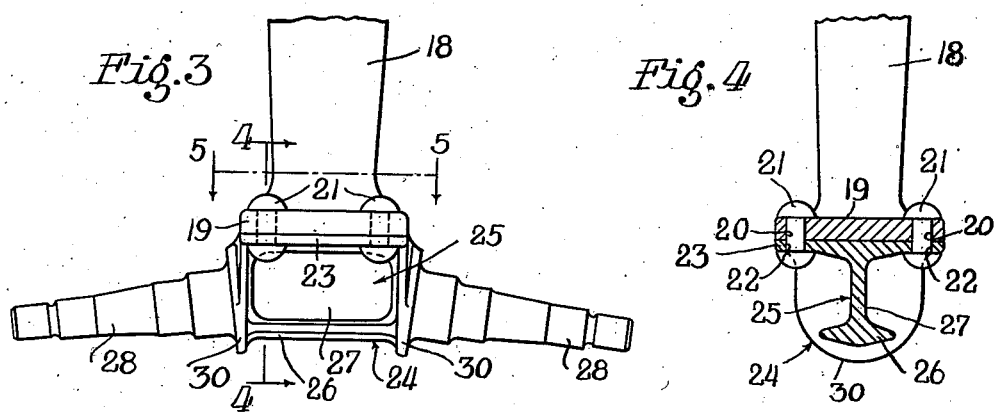
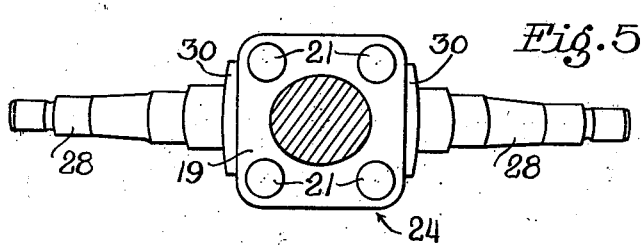
Inventors
Clifford R. Rogers
William O. Beckman
Rudolph A. Holmberg
By Paul O. Pippel
Atty.

Patented Jan. 13, 1942

2,269,988

UNITED STATES PATENT OFFICE 2,269,988

VEHICLE

Clifford R. Rogers, Oak Park, and William O. Bechman and Rudolph A. Holmberg, Chicago, Ill., assignors to International Harvester Company, a corporation of New Jersey Application February 24, 1941, Serial No. 380,174

3 Claims. (Cl. 280—96.1)

This invention relates to a vehicle, and more particularly to a steering truck for a vehicle of the type commonly known as a tricycle type tractor.

In a vehicle of the type referred to, the construction is characterized by the provision of a narrow longitudinal body supported at its rear end by a pair of comparatively large drive wheels and at its forward end by a dirigible truck consisting of a pair of closely spaced steerable wheels. The dirigible truck comprises a vertical standard steerable by a steering wheel accessible to the operator. This standard carries at its lower end a pair of transversely extending spindles, each of which carries a wheel. The construction and design of the steerable front assembly presents one problem, among others, in providing suitable means for mounting the front wheels. The present invention is directed toward overcoming this problem.

The principal object of the invention is, therefore, to provide an improved front truck assembly for a vehicle of the type referred to.

An important object is to provide a two-piece truck construction including a standard and an axle part which may be readily secured together.

Another object is the provision of a one-piece axle adapted to be secured to the upright standard, this axle comprising an integral body portion and a pair of oppositely extending spindles for the wheels.

Another object is to provide a body portion of the axle member with appropriate reenforcing members, one of which serves as a flange for attachment to the vertical standard of the tractor.

A more compete understanding of these and other objects and features of the invention may be had from the following detailed description taken in conjunction with the accompanying sheet of drawing, in which:

Figure 1 is a side elevational view of the forward portion of a tractor of the tricycle type, portions of the tractor being broken away to illustrate more clearly the mounting of the truck standard;

Figure 2 is a front elevational view of the same;

Figure 3 is an enlarged view of the lower portion of the truck assembly illustrating one form that the invention may assume;

Figure 4 is a sectional view of the same taken on the line 4—4 of Figure 3; and, Figure 5 is a transverse sectional view of the structure shown in Figure 3 taken substantially on the line 5—5 of Figure 3.

The tractor chosen for the purposes of illustration is typical of the usual agricultural tractor and comprises a longitudinal body 10 having a front bolster construction 11 provided with a bearing on a vertical axis as at 12. This bearing serves to journal the upper portions of the steering standard 13, the upper end of which is associated by means of gearing, not shown, with a steering shaft 14. This shaft extends rearwardly in the usual manner and may be operated by a steering wheel, not shown, accessible to the vehicle operator. The lower portion of the standard part 13 is provided with a circular horizontal flange 15 to which is secured by a plurality of bolts 16 a circular horizontal flange 17 comprising an integral part of a lower upright standard 18. The lower portion of the standard 18 is provided with a horizontal transverse flange 19, which flange is provided with a plurality of openings 20. These openings receive securing means in the form of a plurality of bolts or rivets 21 which in turn pass through openings 22 in an upper horizontal flange 23 of an axle member 24. The axle member comprises generally a central or intermediate body portion 25 which has a relatively short transverse extent. This body comprises the upper horizontal flange 23, a lower horizontal flange 26, and a vertical connecting rib 27. As best shown in Figure 4, the flanges 23 and 26 and the rib 27 form generally a T so that the intermediate portion of the axle member is T-shaped in cross section. The upper horizontal portion of the flange 23 is suitably finished and fits the lower surface of the flange 19 on the upright standard 18. By this means the two parts may be readily secured together. The axle member 24 further includes a pair of oppositely extending wheel spindles 28, each of which carries rotatably thereon a wheel 29. As best shown in Figure 2, the relationship between the spindles 28 is such that the wheels 29 are closely spaced apart, as is usual in vehicles of the type under consideration. The inner end of each spindle is enlarged to provide a circular flange 30. This flange forms an integral part of the axle and is, of course, rigidly connected with the respective ends of the flanges 23 and 26 and the rib 27 so that a unified cross-connected structure is thereby provided. The axes of the spindles 28 are inclined downwardly from the horizontal so that the wheels 29 have the customary angle with respect to the ground. The axes of the spindles 28 further pass through the plane of the intermediate vertical rib 27.

From the foregoing description it will be seen that the front construction provided is designed with an aim toward eliminating the manufacturing difficulties usually attendant upon the assembly of such constructions. The relationship between the flange 19 of the standard 18 and the flange 23 of the axle 24 provides for ready assembly of the two parts, with the assurance that a rigid construction is thereby provided. The reenforcement of the axle structure by the flanges 23 and 26 and the rib 27 contributes further to the rigidity of the assembly. The shape of the body 25 of the axle 24 insures that the axle may be readily manufactured by forging, a process heretofore accompanied with difficult problems because of the angular relation between the axes of the spindles 28. Certain other desirable features and characteristics of the invention will be readily apparent to those skilled in the art. It will be understood, of course, that the drawing and disclosure refer to only a preferred embodiment of the invention and that numerous modifications and alterations may be made therein without departing from the spirit and scope of the invention as defined by the appended claims.

What is claimed is:

1. A front truck for a tricycle type tractor, comprising an upright standard having a flange disposed transversely of its lower portion, said flange having openings formed therein, an axle member comprising a central portion and a pair of opposite transverse spindles, said central portion being formed with a transverse flange having openings therein and a transverse rib integral with and generally at right angles to said flange, means passed through the openings in the flanges of the axle and standard for rigidly securing the two together, and a pair of wheels carried respectively by the spindles.

2. A front truck for a tricycle type tractor, comprising a vertical standard having a lower horizontal flange portion formed with a plurality of vertical bores, a transverse one-piece axle having a central portion and a pair of opposite, transversely extending spindles, the central portion including an upper horizontal flange cross-connecting the spindles and formed with a plurality of vertical bores aligned respectively with the bores in the flange of the standard, means passing through said bores for rigidly securing the axle and standard together, said central portion of the axle further including a transverse, vertical rib cross-connecting the spindles and formed integral with the upper flange of the axle, and a pair of wheels carried respectively on the spindles.

3. A front truck for a tricycle type tractor, comprising a vertical standard having a lower horizontal flange portion formed with a plurality of vertical bores, a transverse one-piece axle having a central portion and a pair of opposite transversely extending spindles, the inner end of each spindle including a circular flange, the central portion including an upper horizontal flange cross-connecting the circular flanges of the spindles and formed with a plurality of vertical bores aligned respectively with the bores in the flange of the standard, means passing through said bores for rigidly securing the axle and standard together, said central portion of the axle further including a transverse, vertical reenforcing rib cross-connecting the circular flanges of the spindles and formed integral with the upper flange of the axle, and a pair of wheels carried respectively on the spindles.

CLIFFORD R. ROGERS.
WILLIAM O. BECHMAN.
RUDOLPH A. HOLMBERG.